United States Patent
DeVolder

(10) Patent No.: US 8,887,973 B2
(45) Date of Patent: Nov. 18, 2014

(54) HEAD REST RIFLE RACK

(76) Inventor: Glenn DeVolder, Paradise, MT (US)

( * ) Notice: Subject to any disclaimer, the term of this patent is extended or adjusted under 35 U.S.C. 154(b) by 78 days.

(21) Appl. No.: 13/442,278

(22) Filed: Apr. 9, 2012

(65) Prior Publication Data

US 2012/0267408 A1 Oct. 25, 2012

Related U.S. Application Data

(60) Provisional application No. 61/478,732, filed on Apr. 25, 2011.

(51) Int. Cl.
*B60R 7/14* (2006.01)
*B60N 2/44* (2006.01)

(52) U.S. Cl.
CPC ............ *B60R 7/14* (2013.01); *B60N 2002/4405* (2013.01); *Y10S 224/903* (2013.01)
USPC .............................. 224/275; 224/546; 224/903

(58) Field of Classification Search
CPC ............ B60R 7/14; B60R 7/043; B60R 7/10; Y10S 224/913; F41A 23/06; F41A 23/02
USPC ......... 224/275, 546, 550, 555, 556, 567, 571, 224/913; 211/64, 4; 42/70.11; 296/37.15, 296/37.16; 297/188.04, 188.05, 188.06; D12/416
See application file for complete search history.

(56) References Cited

U.S. PATENT DOCUMENTS

| | | | | |
|---|---|---|---|---|
| 3,156,062 A | * | 11/1964 | Stevenson et al. | 42/94 |
| 3,252,637 A | * | 5/1966 | Hart | 224/275 |
| 3,477,586 A | * | 11/1969 | Haluska | 211/64 |
| 4,007,554 A | * | 2/1977 | Helmstadter | 42/94 |
| 4,995,537 A | | 2/1991 | Thedieck | |
| 5,495,969 A | | 3/1996 | Cardenas | |
| 6,279,799 B1 | | 8/2001 | Horton | |
| 6,405,909 B1 | | 6/2002 | Burnett | |
| 6,450,378 B1 | * | 9/2002 | Miller | 224/275 |
| 7,770,319 B2 | * | 8/2010 | McDonald | 42/94 |
| 2004/0237372 A1 | * | 12/2004 | Frye | 42/94 |
| 2008/0047992 A1 | | 2/2008 | Fabian | |
| 2012/0168475 A1 | * | 7/2012 | Golo | 224/275 |

* cited by examiner

*Primary Examiner* — Brian D Nash
*Assistant Examiner* — Corey Skurdal
(74) *Attorney, Agent, or Firm* — Daniel Boudwin; Global Intellectual Property Agency LLC

(57) ABSTRACT

A vehicle gun rack, comprising a set of support racks having posts that replace traditional head rests in a motor vehicle. Existing head rests are removed from two adjacent vehicle seats and replaced with the disclosed racks that are used to support a gun or rifle across the span of the two seats. The device comprises a seat-mountable rack with upstanding supports and a plurality of gun support hooks. The gun support hooks hold a rifle such that the rifle spans the space between the racks, while the racks occupy the head rest receiving post locations on the vehicle seats. The racks are therefore useful in the spaces wherein seat head rests are traditionally located within the interior of a vehicle, which is useful in vehicles where traditional rear window gun racks cannot be mounted because of the particular type of vehicle, including small vehicle or certain two-seater pick-up trucks.

9 Claims, 2 Drawing Sheets

HEAD REST RIFLE RACK

CROSS REFERENCE TO RELATED APPLICATION

This application claims the benefit of U.S. Provisional Application No. 61/478,732 filed on Apr. 25, 2011, entitled "Head Rest Rifle Rack."

BACKGROUND OF THE INVENTION

1. Field of the Invention

The present invention relates to transporting rifles and other guns to and from hunting expeditions, target practice or other destinations. More specifically, the present invention provides an adjustable and removable gun rack for securely storing rifles during transit that replaces head rests in a vehicle and utilizes the same mounting hardware of the head rests to support upstanding gun support racks.

2. Description of the Prior Art

Many individuals are hunters who derive great pleasure from hunting and other outdoor activities associated thereto. Individuals may hunt for sport or recreation, while others hunt animals as a source of sustenance. Some hunters choose to hunt with a bow and arrow; however, the most popular hunting means is a rifle. The present invention is related to the transportation of a rifle or similar weapon to and from a hunting area, and further for general weapon transport in areas where storage of a gun within a vehicle is permitted.

Whether heading to the hunting grounds or to target practice, gun owners often find that they need to transport their guns inside of a motor vehicle. Often, a gun owner will transport the guns in a stowed position within a private vehicle to avoid the need for obtaining special gun carrying permits. When rifles are transported, but not stored in a gun case or gun rack during transport, the rifle owner introduces the risk of damaging the rifle as the rifle may be unsupported and move around in the vehicle due to shifts in moment during transport. Even when guns are stored in a gun case, if multiple guns are stored inside, the guns pose a risk of damaging one another while in the case during transit. A better solution is to store rifles in a gun rack during transit. There are, however, two main problems that exist with motor vehicle gun racks. First, typical gun racks are permanently mounted inside the cab of a motor vehicle. It is very common to see a gun rack mounted near the rear window of a vehicle, such as a pickup truck. It is not always desirable to have a gun rack as a permanent fixture inside one's vehicle. Second, gun racks are typically only designed for use in larger vehicles, such as trucks and sport utility vehicles. Small vehicle owners are left with only the option of storing rifles in a gun case and packaging the rifles such that they do not sustain damage during transport.

The present invention provides a gun rack that is suitable for any vehicle having two side-by-side seats with removable head rests. Head rests in motor vehicles generally employ a dual post or single post mechanism that allows retainment of the head rest and height adjustment thereof. The posts engage a corresponding receiving slot that securely holds the posts in place, while a push button release allows for its vertical adjustment or complete removal. The present invention contemplates removal of an existing head rest, while utilizing the existing hardware thereof to support one or a plurality of upstanding gun racks that can support a gun by itself or across a span of two side-by-side vehicle seats.

Several applications have published and patents been granted to devices that attempt to provide a means of securely storing rifles and other guns during transit, while also protecting the rifles from damage. U.S. Patent Publication No. 2008/047,992 to Fabian describes a holder for a bow that attaches to the backside of a vehicle seat to securely store the bow during transit. At the top of the device there is a loop that is placed over the head rest of a seat in a vehicle. When the head rest loop is in place, the bow holding device rests against the backside of the seat in a vertical orientation and is fastened to the underside of the vehicle seat by an attachment means. The device has a bow holding pocket, which may also store arrows at its base. A user places the lower end of the bow and the pointed end of any arrows into the bow holding pocket. The device also comprises a strap midway between the bow holding pocket and the head rest loop of the device. The purpose of the strap is to secure the bow, and any arrows that may be accompanying the bow into the device during transit.

Similar to the Fabian device, U.S. Pat. No. 6,405,909 to Burnett describes a gun rack that attaches to the backside of a vehicle seat to securely store rifles during transit. The device has a set of rifle holding pockets stacked one on top of the next. Each rifle holding pocket allows for a user to insert a rifle through the pocket. A rifle rests in the pocket during transport in a horizontal orientation. At the top of the series of rifle holding pockets is a loop that is placed over the head rest of a seat in a vehicle. When the head rest loop is in place, the rifle holding pockets rest against the backside of the seat and are fastened to the underside of the vehicle seat by an attachment means. One embodiment of the Burnett device incorporates the use of bungee cords to secure the bottom of the device to the underside of a vehicle seat. The Burnett patent describes both open pockets—where a rifle is inserted through the pocket and emerges from the other end of the pocket, so that both ends of the rifle are exposed—as well as sealable pockets for storage of rifles. The sealable rifle holding pockets are large and able to conceal an entire gun inside and can be sealed once the gun is placed in the pocket by a means, such as a zipper. The sealable pocket embodiment of the Burnett device attaches to the backside of a bench-style seat in a vehicle.

A problem shared by the Fabian and Burnett devices is that in order for a user to utilize either device, there must be space behind a seat sufficient enough to store the guns or bow. While this is unlikely to be a common problem, as any vehicle with a back seat would be able to use this device when strapped to the backside of a front seat in a motor vehicle, there are vehicles that do not have space behind the front seat of the vehicle. Some small cars are two-seater vehicles, as well as some small cab trucks. A gun or bow owner with one of these particular vehicles would be unable to use either the Fabian or the Burnett devices for storing his or her gun or bow. Unlike the devices described in the Fabian and Burnett patents, the present invention can be used in any vehicle where the seats have removable head rests. The present invention is not limited by the size of the vehicle since it utilizes existing head space within the cab of a vehicle that is otherwise occupied by the occupant head rests.

U.S. Pat. No. 5,495,969 to Cardenas describes another gun rack that mounts to the backside of a vehicle's backseat. The Cardenas device can hold multiple rifles, but is limited to use to vehicles wherein there is a backseat and a space behind the backseat to store the device while holding the guns. The device sits behind the backseat of a vehicle at an angle such that the muzzles of the rifles that are harnessed into the device and are pointed towards the interior ceiling of the vehicle. The device further employs a gun holding plank with a rifle butt holding rack located at the base of the device, along with a rifle muzzle holding rack at the top of the device. The muzzle holding rack also has extending from it, in the opposite direction of the muzzle holding portion of the rack, a lip that extends beyond the plane of the plank over the top of the backseat of the vehicle. The device is secured by this lip to the backseat of the vehicle with a seatbelt.

To use the Cardenas device, a user places the rifles into the rifle rack, resting the butt of the gun in the rifle butt holding rack and the muzzle into the muzzle holding rack such that the muzzle points upwards and towards the ceiling of the vehicle. The length of the device is capable of extending to accommodate longer rifles if necessary. The device incorporates a strap that can be secured over all the guns once the guns have been placed in the rack. The strap fastens across all the rifles held by the device. While the device secures the rifles during transit, the device is limited for use in vehicles that are capable of accommodating the size of the device and the size of the guns held in a vertical orientation. The present invention can be used in any vehicle wherein the seats have removable head rests. The present invention is not limited by the size of the vehicle because it extends upward into existing head space within the cab of a vehicle and supports a gun in a horizontal position.

U.S. Pat. No. 6,279,799 to Horton describes an adjustable gun rack that straps to a bench seat in a vehicle. The device is capable of holding a single rifle oriented in a horizontal position and can either strap to the backside of a bench seat or the front of the seat portion of a bench seat in a vehicle—the area where a passenger seated on the bench seat may rest their legs. The device has two straps that attach to the rifle holding case by a hook system, such as a carabineer and receiving grommet. The two straps are adjustable and can wrap around the back support portion of a bench seat to secure the device to the backside of a bench seat, or the seat cushion of a bench seat to secure the device to the front of the seat portion in a bench seat in a vehicle. The rifle rests in a padded rifle holding pouch that zips shut. The device serves dual purposes. The rifle holding case, in conjunction with one of the adjustable straps, can serve as an over-the-shoulder gun tote during a hunting expedition or a case for storage during transport in a vehicle.

The Horton adjustable gun rack device is limited to holding a single rifle. Hunting is often a group sport where individuals gather together with friends and then travel to a hunting location. When multiple hunters travel together, or an individual hunter has multiple rifles he or she would like to take to the hunting grounds or target practice, secure storage of the plurality of guns during transportation is necessary. The present invention is capable of holding multiple rifles simultaneously during transit. Additionally, the structure and means of attaching the Horton device differs from the present invention, wherein head rest posts are utilized to support upstanding gun racks across a pair of vehicle seats.

U.S. Pat. No. 4,995,537 to Thedieck describes an adjustable rifle muzzle holding belt that attaches to two points along the interior frame of a vehicle. The muzzle holding belt can be adjusted to be longer or shorter depending on the number of rifles that need to be stored within the device and the amount of space available to the user for gun storage purposes in the transportation vehicle. Once the adjustable muzzle holding belt is mounted to the interior frame of a vehicle, a user guides the rifle muzzles through the loops in the belt such that the guns achieve a vertical orientation, with the muzzle of the rifles pointed directly upwards while the gun stocks rest on the floor of the vehicle. The constraints associated with using the Thedieck device include the fact that the device must be mounted to the interior frame of a motor vehicle and that the rifles secured by the device must fit into a space that is perpendicular to the length of the adjustable muzzle holding belt (i.e. the vertical space within the vehicle). Use of the Thedieck device in a small vehicle or a vehicle that has limited space for storing rifles would be impractical. The present invention can be used in any sized vehicle because it utilizes the space wherein seat head rests are traditionally located within the cab of a vehicle, which is a space that exists in any vehicle with a side-by-side seating configuration employing removable head rests.

It is therefore submitted that the present invention substantially diverges in design elements from the prior art, and consequently it is clear that there is a need in the art for an improvement to existing removable gun rack devices for use in motor vehicles. In this regard the instant invention substantially fulfills these needs.

SUMMARY OF THE INVENTION

In view of the foregoing disadvantages inherent in the known types of gun and hunting implement vehicle racks now present in the prior art, the present invention provides a new removable gun rack wherein the same can be utilized for providing convenient and secure storage of rifles during transportation of the rifles in a private vehicle.

It is therefore an object of the present invention to provide a new and improved removable and adjustable gun rack device for use in a vehicle that has all of the advantages of the prior art and none of the disadvantages.

It is also an object of the present invention to provide a removable and adjustable gun rack device with a means of securing rifles and other guns during transportation in any vehicle having side-by-side seating and seats with removable head rests, regardless of the size of the motor vehicle used for transporting the guns.

Another object of the present invention is to utilize the head space within the cab of a vehicle traditionally associated with head rests as a space for storing guns during transportation, whereby the existing head rests are replaced.

Another object of the present invention is to provide a removable and adjustable gun rack device that utilizes the head rest receiving posts of a typical motor vehicle seat as a support for an upstanding gun rack.

Another object of the present invention is to allow retainment of elongated rifles using a pair of upstanding racks across two side-by-side vehicle seats.

Yet another object of the present invention is to provide users with an easily removable gun rack that does not cause damage to a vehicle and can be replaced with the original seat head rests when the gun rack is not in use.

A final object of the present invention is to provide a vehicle gun rack device that can retain and secure a plurality of guns simultaneously.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
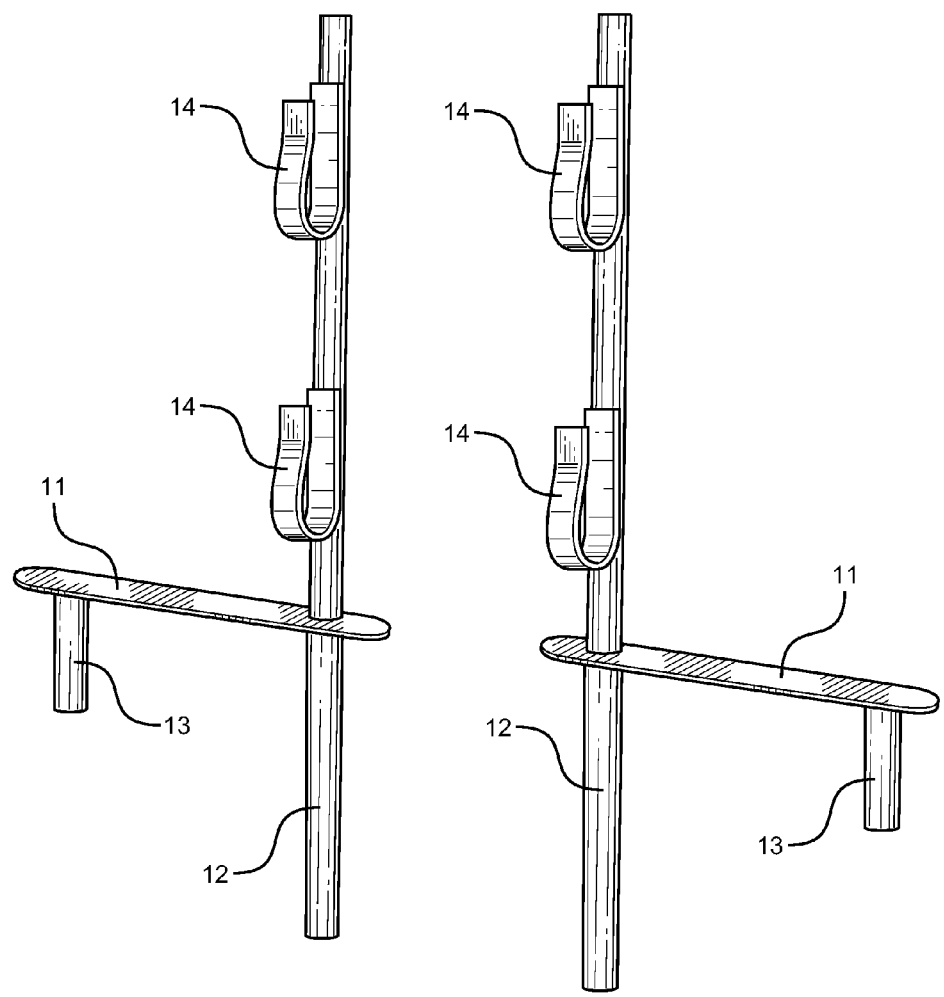
FIG. 1 is a perspective view of the pair of gun support brackets of the present invention when not in use.

Reference is made herein to the attached drawings. Like reference numerals are used throughout the drawings to depict like or similar elements of the vehicle gun rack device. For the purposes of presenting a brief and clear description of the present invention, the preferred embodiment will be discussed as used for transporting and securing guns using a rack system that replaces a standard vehicle head rest and utilizes existing mounting hardware therefrom. The figures are intended for representative purposes only and should not be considered to be limiting in any respect.

Referring now to FIG. 1, there is shown a perspective view of a pair of gun support brackets as described by the present invention. Each gun support bracket comprises a pair of vertical rods 12 and one horizontal bar 11. The horizontal bar 11 serves as the base for the device once the first and second vertical rods 12, 13 are inserted into head rest receiving slots within a motor vehicle. The horizontal bar 11 mates flushly against the top of the seat once in a working position and prevents the rods from inserting too far into the seat. The first rod 12 extends both above and below the horizontal base bar 11, and is ideally suited to be mounted at the interior side of the horizontal bar 11, such that the upstanding portions of a pair of first rods 12 are mounted in close proximity between two side-by-side seats, providing support for a rifle or similar gun at its handle and forward hand support position, as opposed to its butt and barrel end. In one embodiment of the present invention, the horizontal bar 11 mounts within a groove provided in the first rod 12, allowing 360 degree rotation of the horizontal bar 11 therearound. This allows the first rod 12 to be interiorly or exteriorly positioned on a vehicle head rest mount.

The first vertical rod 12 is the longer of the two vertical rods, while the shorter of the two vertical rods—the second vertical rod 13—only extends slightly below the horizontal bar 11 to engage a head rest receiving slot without engaging any retainment mechanism mounted therein. When inserting the gun support bracket into the head rest receiving slots of a particular seat in a vehicle, a user preferably orients the gun support bracket such that the interior vertical rod of the gun support bracket will be inserted into the head rest receiving hole that is closest to the center of the vehicle. The user then aligns the vertical rods of the gun support bracket with the head rest receiving slots and inserts the gun support bracket into the head rest receiving slots. When a gun support bracket is properly installed into the head rest receiving slots of the vehicle seat, the horizontal bar 11 of the gun support bracket lies flush with the top of the seat. It may be preferred to include retainment notches along the first or second vertical rod, wherein the notches utilize the head rest retainment mechanism of the particular vehicle to prevent dislodgement or dislocation of at least one vertical rod when placed in a head rest receiving slot. This embodiment may vary between different head rest designs and vehicle makes, and therefore may not be preferable; however it is contemplated to disclose such a retainment means. The retainment means may include a latch that engages a notch in the vertical rod, or alternatively no notch may be provided and the weight of the device, the length of the rods within the receiving slots and the weight of any mounted guns will provide sufficient securement of the device during operation. A further embodiment of the first and second vertical rods 12, 13 include equal length rods, wherein each rod engages a head rest receiving slot to an equal depth.

The portion of the first vertical rod extends above the horizontal bar 11 and has attached to it a series of gun support hooks 14. When the gun support brackets are positioned on two side-by-side vehicle seats, a user may set a gun, such as a rifle or shotgun, within the gun support hooks of each bracket such that one end of the gun sits within a gun support hook 14 of the first gun support bracket and the second end of the gun sits within a gun support hook 14 of the second gun support bracket. The rifle spans the space in between the gun support brackets and is supported in a horizontal configuration. Each gun support bracket, including each gun support hook 14, may be coated with a rubber or similar protective coating, which increases the grip of the gun support hook 14 on a rifle that is placed in the hook, which discourages the rifle from moving during transit. A protective coating also diminishes the possibility of the hooks scratching or otherwise damaging the outer surface of the gun while attached thereto.

To position the disclosed gun support bracket in a working position, an individual removes the existing vehicle head rests from the top of two seats that are adjacent to one another in a motor vehicle, exposing the head rest receiving slots and exposing those slots for use by the gun support brackets. A user may remove the driver and front seat passenger head rests or remove two head rests of any pair of seats that are adjacent to one another within the vehicle. Next, an individual inserts the gun support brackets into the head rest receiving slots using the providing pair of vertical rods 12, 13. The upstanding portion of the first vertical rod 12, which supports the gun support hooks thereon, may be positioned over either slot provided by a pair of head rest receiving slots (i.e. the inboard or outboard slot), depending on the length of the gun being carried and user preference. It has been shown to be most effective when each upstanding portion of the support bracket is placed on the inboard receiving slot.

The present invention is not meant to be limited to merely the storage of rifles. The device may also be used to store other guns and elongated objects during transit. Some examples include rifles, shotguns, bows and arrows, or even fishing rods if the storage of such devices is desired by the user.

Figure 2:
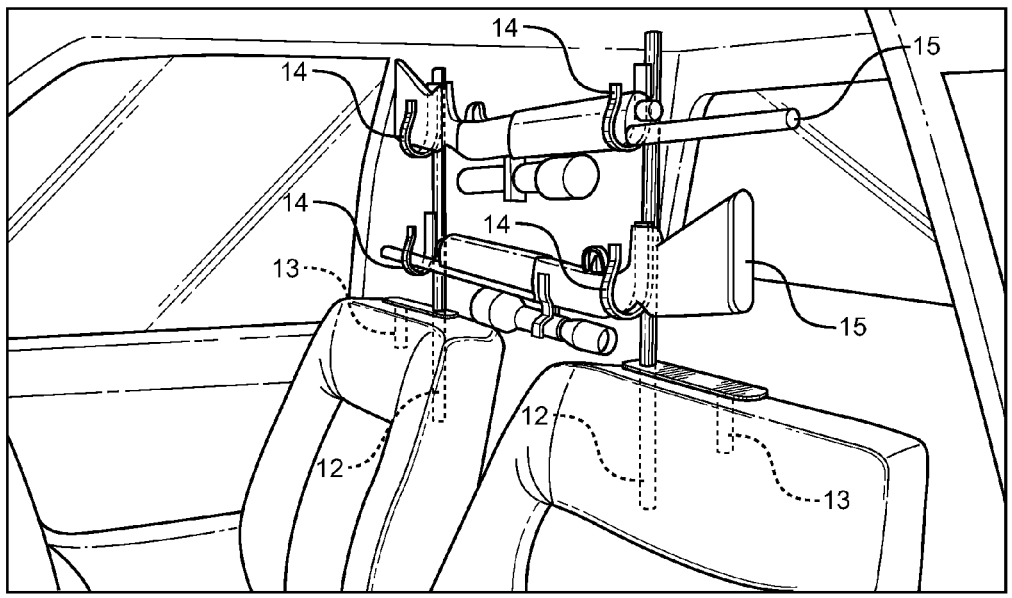
FIG. 2 is a perspective view of the present invention where a gun support bracket has been inserted into the head rest receiving slots at the top of each seat.

Referring now to FIG. 2, there is shown a perspective view of the present invention in a working position, wherein a pair of gun support brackets have been inserted into the head rest receiving slots of two adjacent vehicle seats. Two rifles 15 have been placed upside down within the gun support hooks 14 of the device. When the pair of gun support brackets is inserted into the head rest receiving slots of two adjacent seats in a vehicle, the brackets are ideally configured such that the two upstanding vertical rods are positioned closer the center of the motor vehicle. This orientation will place the set of gun support hooks 14 on each vertical rod of each gun support bracket in close proximity to one another. A user can then place a rifle in the gun support hooks 14, such that the rifle rests in one gun support hook 14 on each of the two brackets and the rifle spans the space in between the two gun support brackets. As shown, the device is capable of supporting more than one gun, if desired. A further embodiment may include one, two or a plurality of support hooks 14 along each upstanding rod 12.

When in use, the present invention removes the head rests of two adjacent seats in a vehicle and utilizes the head space above where the head rest traditionally belongs in a vehicle for the purpose of securely transporting rifles in a private vehicle. The device can be used in any sized vehicle that has two seats with removable head rests that exist adjacent to one another.

Figure 3:
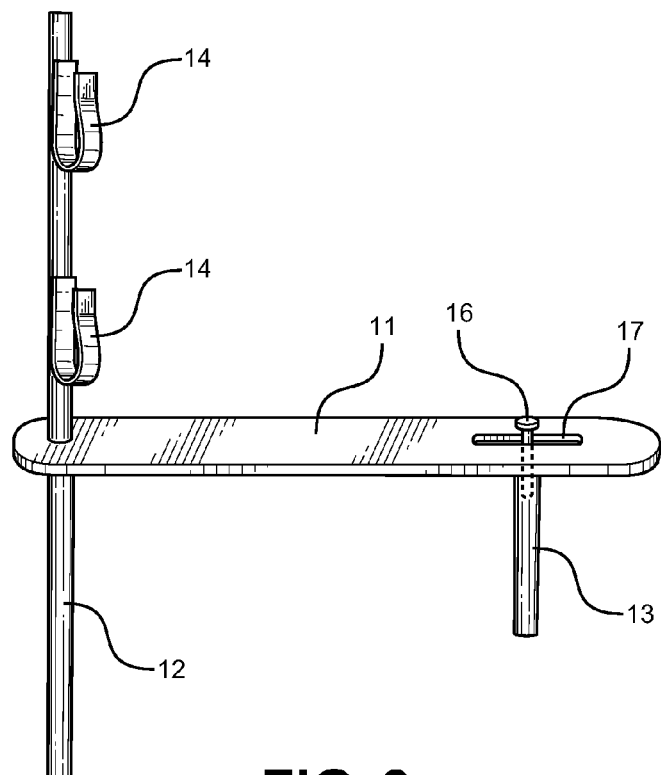
FIG. 3 is a perspective view of the present invention showing the adjustment mechanism for the exterior rod of the device. The exterior rod can be adjusted on the horizontal bar to accommodate various distances between head rest receiving slots in different makes and models of motor vehicles.

Referring now to FIG. 3, there is shown a perspective view of the present invention illustrating an adjustment mechanism 16 associated with the second vertical rod 13 of the gun support bracket that allows for adjustment of the distance between the first and second vertical bar 12, 13 to accommodate the head rest receiving holes of a particular vehicle seat. The present invention incorporates an adjustment mechanism 16 wherein the second vertical rod 13 is slideable along a slot 17 within the horizontal bar 11. The second vertical rod 13 has a fixed diameter along the length of the rod, except slotted area along its length that fits within the slot 17 in the horizontal bar 11. The step in diameter along the length of the second vertical rod 13 fits inside the horizontal bar slot 17 and allows the rod 13 to move freely within the slot of the horizontal bar 11 while preventing its removable therefrom. In this way, the slot acts as an indented groove or ring for which the slot 17 engages. The translational freedom of movement associated with the second vertical rod enables a user to move the rod closer to, or further away from, the first vertical bar to better accommodate any variation in distance between the head rest receiving holes of various makes and models of vehicles.

It is not desired to limit the diameter and length of the vertical rods utilized in the present invention. These dimensions may vary between different vehicle makes and models, or particular seat manufacturers. A further embodiment of the present invention is the utilization of a single vertical bar, wherein one bar engages a head rest receiving slot and supports one or a plurality of gun support hooks along its upstanding length. A second rod may be incorporated, along with the disclosed horizontal bar, which may be swivel mounted on the first vertical rod. It is desired to disclose a gun rack device that utilizes the existing hardware from a vehicle head rest, once removed, while disclosing several designs that accomplish this task.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle gun rack adapted to replace the head rests of a pair of adjacent seats within a motor vehicle, comprising:
   a first and second gun support bracket;
   said support brackets adapted to be positioned on separate adjacent seats;
   said first gun support bracket adapted to support a first end of a gun;
   said second gun support bracket adapted to support a second end of said gun;
   each of said support brackets having a first and a second vertical rod;
   said first vertical rod having at least one gun support hook attached along its length;
   said least one gun support hook comprising a hook tip;
   said first and second vertical rod adapted to engage head rest receiving slots;
   a horizontal bar perpendicularly mounted to said first and second vertical rod below said gun support hooks, said horizontal bar adapted to flushly rest against said seat when said first and second vertical rod is placed within said head rest receiving slots.

2. The device of claim 1, wherein said horizontal bar is an elongated member having said second vertical rod perpendicularly mounted thereto and adapted to engage a second head rest receiving slot.

3. The device of claim 2, wherein said horizontal bar is rotatably mounted to said first vertical rod, wherein said horizontal bar may freely rotate around said first bar.

4. The device of claim 2, further comprising an adjustment mechanism for varying said second vertical rod location along said horizontal bar length.

5. The device of claim 4, wherein said adjustment mechanism further comprises a slot along said horizontal bar and a groove along said second vertical rod to allow translation of said second vertical rod within said slot.

6. The device of claim 2, wherein said second vertical rod extends only below said horizontal bar to engage a second head rest receiving slot.

7. The device of claim 1, wherein said first vertical rod comprises an upstanding region above said horizontal bar and a head rest receiving slot engagement region below said horizontal bar, and set of gun support hooks are attached to said upstanding region.

8. The device of claim 1, wherein said gun support hooks further comprise a protective coating to prevent damage or dislocation of said supported article.

9. The device of claim 1, wherein said gun support hooks are U-shaped and comprise a first and a second end, said first end attached to said first vertical rod; and said second end is free.

* * * * *